United States Patent
Lähteenmäki et al.

(10) Patent No.: US 12,556,171 B2
(45) Date of Patent: Feb. 17, 2026

(54) APPARATUS, ARRANGEMENT AND METHOD FOR ELECTROMAGNETIC ISOLATION FOR QUANTUM COMPUTING CIRCUIT

(71) Applicant: IQM FINLAND OY, Espoo (FI)

(72) Inventors: Pasi Lähteenmäki, Espoo (FI); Mikko Möttönen, Espoo (FI)

(73) Assignee: IQM FINLAND OY, Espoo (FI)

( * ) Notice: Subject to any disclaimer, the term of this patent is extended or adjusted under 35 U.S.C. 154(b) by 45 days.

(21) Appl. No.: 18/576,144

(22) PCT Filed: Jul. 13, 2021

(86) PCT No.: PCT/FI2021/050532
§ 371 (c)(1),
(2) Date: Jan. 3, 2024

(87) PCT Pub. No.: WO2023/285727
PCT Pub. Date: Jan. 19, 2023

(65) Prior Publication Data
US 2024/0388282 A1    Nov. 21, 2024

(51) Int. Cl.
H03K 5/12    (2006.01)
G06N 10/20    (2022.01)
H03F 7/00    (2006.01)
H03K 5/125    (2006.01)

(52) U.S. Cl.
CPC ............. H03K 5/125 (2013.01); G06N 10/20 (2022.01); H03F 7/00 (2013.01)

(58) Field of Classification Search
CPC ......... H03F 19/00; G06N 10/20; H03K 5/125
See application file for complete search history.

(56) References Cited

U.S. PATENT DOCUMENTS

| | | |
|---|---|---|
| 2017/0091646 A1 | 3/2017 | Abdo |
| 2017/0092833 A1 | 3/2017 | Abdo |
| 2017/0132524 A1* | 5/2017 | Abdo ....................... H03F 3/607 |
| 2021/0305958 A1 | 9/2021 | Hassel et al. |
| 2023/0119964 A1* | 4/2023 | Beck ....................... G06N 10/40 |
| | | 257/31 |

FOREIGN PATENT DOCUMENTS

| | | |
|---|---|---|
| CN | 213426111 U | 6/2021 |
| JP | 2012157667 A | 8/2012 |
| JP | 2022528602 A | 6/2022 |
| WO | WO-2021061776 A1 * | 4/2021 ............. G06N 10/40 |

OTHER PUBLICATIONS

International Search Report issued in PCT/2021/050532, mailed Apr. 7, 2022.
International Preliminary Report on Patentability issued in PCT/2021/050532, mailed Sep. 4, 2023.
Office Action for Japanese Application No. 2024-501887, dated Nov. 18, 2025, 6 Pages.

* cited by examiner

Primary Examiner — Daniel C Puentes
(74) Attorney, Agent, or Firm — Meunier Carlin & Curfman LLC

(57) ABSTRACT

Disclosed is an apparatus and a method for facilitating a first frequency filtering and a second frequency filtering together with non-reciprocal frequency conversion for electromagnetic isolation.

19 Claims, 5 Drawing Sheets

APPARATUS, ARRANGEMENT AND METHOD FOR ELECTROMAGNETIC ISOLATION FOR QUANTUM COMPUTING CIRCUIT

CROSS REFERENCE TO RELATED APPLICATIONS

The application is a U.S. National Stage application filed under 35 U.S.C. § 371 of PCT/FI2021/050532, filed Jul. 13, 2021.

FIELD

The present invention relates to electromagnetic isolation for quantum computing.

BACKGROUND

The readout chain of a quantum computer typically requires a large number of bulky and expensive circulators to isolate the quantum processing unit from back action noise from the following semiconductor amplifiers at higher temperature stages of the cryostat. These circulators also present a large thermal mass and take a mechanically large amount of space.

A number of alternative implementations for the circulators exist. Typically, these rely on Hall effect and corresponding phenomena. These technologies are not at a mature state and often face significant issues in terms of reliability, impedance matching, dynamic range, bandwidth and sensitivity to external factors.

OBJECTIVE

An objective is to alleviate the disadvantages mentioned above.

Also, an objective is to eliminate the need for such circulators entirely.

SUMMARY

In accordance with the present disclosure, it has been found that non-reciprocal frequency conversion may be effectively used for isolation for a quantum computing circuit, when the non-reciprocal frequency conversion is combined with frequency filtering before and after the frequency conversion.

According to a first aspect, an apparatus for electromagnetic isolation is provided, for example for a quantum computing circuit. The apparatus comprises a first frequency filter, which may be configured for transmitting signals having a frequency within a first lower frequency range and terminating signals having a frequency within a first higher frequency range. The apparatus also comprises a second frequency filter, which may be configured for terminating signals having a frequency within a second lower frequency range and transmitting signals having a frequency within a second higher frequency range. The apparatus comprises a frequency converter having a first input/output end, which may be coupled to the first frequency filter, and a second input/output end, which may be coupled to the second frequency filter. The frequency converter can be configured to become non-reciprocal with respect to signal transmission between the first input/output end and the second input/output end, for example in response to an external drive signal to or for the frequency converter, for either relatively suppressing or relatively strengthening output signals of the frequency converter having a frequency within the first lower frequency range at the first input/output end of the frequency converter with respect to output signals of the frequency converter having a frequency within the second higher frequency range at the second input/output end of the frequency converter. This allows a readout signal having a readout frequency to be transmitted through the apparatus so that upon entering the readout frequency corresponds to an input frequency and upon leaving the readout frequency corresponds to an output frequency, different from the input frequency. A frequency range outside the input frequency may be blocked by the first frequency filter, if the first input/output end is an input end for the readout signal, or the second frequency filter, if the second input/output end is an input end for the readout signal. Correspondingly, a frequency range outside the output frequency may be blocked by the first frequency filter, if the first input/output end is an output end for the readout signal, or the second frequency filter, if the second input/output end is an output end for the readout signal. Importantly, any back-action signal can be reduced as well, even when it has a frequency corresponding to the output frequency for the readout signal. This is facilitated by the non-reciprocal frequency conversion, allowing the back-action signal to be at least relatively attenuated with respect to the readout signal.

It has been found that the frequency conversion may be effectively performed by an amplifier that can be operated non-reciprocally, thereby amplifying signal transmission in a forward direction, such as a readout direction, and attenuating signal transmission in a back-action direction. Additionally, for the electromagnetic isolation, no magnetic components are required.

In an embodiment, in response to the external signal, the frequency converter is configured to produce a gain to its output signal having a frequency within the second higher frequency range at the second input/output end of the frequency converter and/or an attenuation to its output signal having a frequency within the first lower frequency range at the first input/output end of the frequency converter. This allows the apparatus to facilitate transmission of a readout signal in the direction, where the first input/output end is an input end for the readout signal and the second input/output end is an output end for the readout signal, while suppressing transmission of any back-action signal in the opposite direction. This then allows the frequency of the readout signal to be upconverted by the apparatus, while suppressing back-action.

In an embodiment, in response to the external signal, the frequency converter is configured to produce a gain to its output signal having a frequency within the first lower frequency range at the first input/output end of the frequency converter and/or an attenuation to its output signal having a frequency within the second higher frequency range at the second input/output end of the frequency converter. This allows the apparatus to facilitate transmission of a readout signal in the direction, where the second input/output end is an input end for the readout signal and the first input/output end is an output end for the readout signal, while suppressing transmission of any back-action signal in the opposite direction. This then allows the frequency of the readout signal to be downconverted by the apparatus, while suppressing back-action.

As indicated, the frequency converter may thus also be an amplifier, for example as in the two previous embodiments. This has an added effect for quantum circuits as it facilitates reaching the quantum limit for noise for amplification.

In an embodiment, the frequency converter comprises or consists of one or more traveling wave parametric amplifiers (TWPA). It has been found that the TWPA may be configured to perform or facilitate any or all of the acts related to frequency conversion. This includes providing gain to the readout signal, while attenuating a back-action signal, which may have the same or corresponding frequency as the readout signal. TWPA has also been found particularly effective for use with a quantum computing circuit. For example, they may provide extended bandwidth and/or dynamic range. Additionally, TWPA represents a relatively mature technology and can therefore be readily and reliably applied in this context. In comparison to other technologies, TWPAs may allow easier accomplishment for a favorable noise temperature and isolation.

In an embodiment, the frequency converter comprises or consists of one or more tunable phase shifters and/or Josephson parametric converters. It has been found that such a device may be configured to perform or facilitate any or all of the acts related to frequency conversion. Josephson parametric converters may provide amplification and/or de-amplification between several different frequency modes.

In an embodiment, the first and/or the second frequency filter is a passive filter. This has been found to facilitate simple and reliable frequency filtering that may still be utilized in the context of quantum computing circuits. In particular, it allows realizing the isolation without including unnecessary power dissipation.

In an embodiment, the first lower frequency range corresponds to the second lower frequency range and/or the first higher frequency range corresponds to the second higher frequency range. Correspondingly, the first and the second frequency filter may be mirrored in frequency with respect to each other.

According to a second aspect, an arrangement, which may also be used for electromagnetic isolation, for example for a quantum computing circuit, is disclosed. The arrangement comprises an apparatus according to the first aspect or any of its embodiments, alone or in any combination. It also comprises a third frequency filter configured for transmitting signals having a frequency within a third frequency range and terminating signals having a frequency within a frequency range outside the third frequency range. The third frequency range may coincide, partially or fully, with the first or the second frequency range, whichever is further away from the third frequency filter in the signal transmission direction across the arrangement. This allows the third and the first or second frequency filter to form a signal entry and exit points where signals of same or corresponding frequencies are transmitted, while others may be terminated. The arrangement comprises also a second frequency converter coupled between the apparatus and the third frequency filter. This is performed in such a manner that, in response to an input signal having an input frequency provided to the apparatus, the arrangement is configured to produce from the third frequency filter an output signal having an output frequency corresponding substantially to the input frequency or, in response to an input signal having an input frequency provided to the third frequency filter, the arrangement is configured to produce from the apparatus an output signal having an output frequency corresponding substantially to the input frequency. In the first alternative, the third frequency filter is arranged to provide the signal entry point for the arrangement, whereas in the second alternative it is arranged to provide the signal exit point for the arrangement. Both alternatives allow the arrangement to provide electromagnetic isolation without altering or substantially altering the frequency of the signal, such as a readout signal, when it is transmitted through the arrangement. The second frequency converter may also be non-reciprocal with respect to signal transmission direction, for example in response to an external drive signal. The arrangement may also allow markedly improved isolation.

According to a third aspect, an arrangement, which may also be used for electromagnetic isolation, for example for a quantum computing circuit, is disclosed. The arrangement comprises a quantum processing unit coupled to one or more apparatuses according to the first aspect or any of its embodiments, alone or in any combination, and/or the arrangement according to the second and/or the third aspect for preventing back-action noise into the quantum processing unit.

According to a fourth aspect, a method for electromagnetic isolation, for example for a quantum computing circuit, is disclosed. The method comprises performing or facilitating frequency filtering at a first frequency filter, for example where signals having a frequency within a first lower frequency range are transmitted and signals having a frequency within a first higher frequency range are terminated. The method also comprises performing or facilitating frequency filtering at a second frequency filter, for example where signals having a frequency within a second lower frequency range are terminated and signals having a frequency within a second higher frequency range are transmitted. The method comprises performing or facilitating frequency conversion, for example at a frequency converter as disclosed herein, between a first input/output end coupled to the first frequency filter and a second input/output end coupled to the second frequency filter. The frequency conversion may be non-reciprocal with respect to signal transmission between the first input/output end and the second input/output end, for example in response to an external drive signal for the frequency conversion, for either relatively suppressing or relatively strengthening output signals of the frequency conversion having a frequency within the first lower frequency range at the first input/output end with respect to output signals of the frequency conversion having a frequency within the second higher frequency range at the second input/output end. In the method, a readout signal may be received as an input signal to the first frequency filter and provided as an output signal from the second frequency filter, so that the first input/output end functions as an input end for the readout signal and the second input/output end functions as an output end for the readout signal. Alternatively, a readout signal may be received as an input signal to the second frequency filter and provided as an output signal from the first frequency filter, so that the second input/output end functions as an input end for the readout signal and the first input/output end functions as an output end for the readout signal.

In an embodiment, in response to the external signal, the frequency conversion produces a gain to its output signal having a frequency within the second higher frequency range at the second input/output end and/or an attenuation to its output signal having a frequency within the first lower frequency range at the first input/output end.

In an embodiment, in response to the external signal, the frequency conversion produces a gain to its output signal having a frequency within the first lower frequency range at the first input/output end and/or an attenuation to its output signal having a frequency within the second higher frequency range at the second input/output end.

In an embodiment, the frequency conversion is performed or facilitated by one or more traveling wave parametric amplifiers.

In an embodiment, the frequency conversion is performed or facilitated by one or more tunable phase shifters and/or Josephson parametric converters.

In an embodiment, the frequency filtering at the first and/or the second frequency filter is performed passively.

In an embodiment, the first lower frequency range corresponds to the second lower frequency range and/or the first higher frequency range corresponds to the second higher frequency range.

According to a fifth aspect, a method, which may also be used for electromagnetic isolation, for example for a quantum computing circuit, is disclosed. The method comprises performing a first method according to the fourth aspect or any of its embodiments, alone or in any combination. It also comprises facilitating frequency filtering at a third frequency filter, where signals having a frequency within a third frequency range are transmitted and signals having a frequency within a frequency range outside the third frequency range are terminated. The method comprises facilitating a second frequency conversion, which may also be non-reciprocal with respect to signal transmission direction, for example in response to an external drive signal, between frequency filtering at the third frequency filter and frequency filtering at the first or the second frequency filter. This is performed in such a manner that, in response to the first method being performed to an input signal having an input frequency, an output signal having an output frequency corresponding substantially to the input frequency is produced from the third frequency filter or, in response to providing an input signal having an input frequency to the third frequency filter, an output signal having an output frequency corresponding substantially to the input frequency is produced from the first or the second frequency filter.

This can be achieved by the two frequency conversions being performed alternatingly with the three frequency filterings and is applicable to both the arrangement of the second aspect and the method of the fifth aspect and their embodiments. Because the frequency filtering between the two other frequency filterings and the two frequency conversions is performed with a frequency filter, i.e. the first filter or the second filter, that can be complementary with the third frequency filter, signals having a frequency within the third frequency range can be terminated there. However, they may still be transmitted at the other filter, i.e. the first filter or the second filter, which may thereby provide a signal entry or exit point for the arrangement. Overall, signals having a frequency within the third frequency range may be transmitted before and after the two frequency conversions. At the same time, such signals may be terminated between the two frequency conversions. Conversely, signals having a frequency within the range outside the third frequency range may be terminated before and after the two frequency conversions. At the same time, such signals may be transmitted between the two frequency conversions. This signal termination together with the non-reciprocal frequency conversion allows electromagnetic isolation while maintaining the signal frequency, in particular in the forward direction.

According to a sixth aspect, a method which may also be used for electromagnetic isolation, for example for a quantum computing circuit, is disclosed. The method comprises performing the method according to the fourth aspect or any of its embodiments, alone or in any combination, and/or the method according to the fifth and/or the sixth aspect for preventing back-action noise into a quantum processing unit.

It is to be understood that the aspects and embodiments described above may be used in any combination with each other. Several of the aspects and embodiments may be combined together to form a further embodiment. The features and effects disclosed in conjunction with the first, second and third aspect and their embodiments, may be applied correspondingly in conjunction with the fourth, fifth and sixth aspect and their embodiments, respectively.

BRIEF DESCRIPTION OF THE DRAWINGS

The accompanying drawings, which are included to provide a further understanding and constitute a part of this specification, illustrate examples and together with the description help to explain the principles of the disclosure. In the drawings.

Like references are used to designate equivalent or at least functionally equivalent parts in the accompanying drawings.

DETAILED DESCRIPTION

The detailed description provided below in connection with the appended drawings is intended as a description of examples and is not intended to represent the only forms in which the example may be constructed or utilized. However, the same or equivalent functions and structures may be accomplished by different examples.

Figure 1:
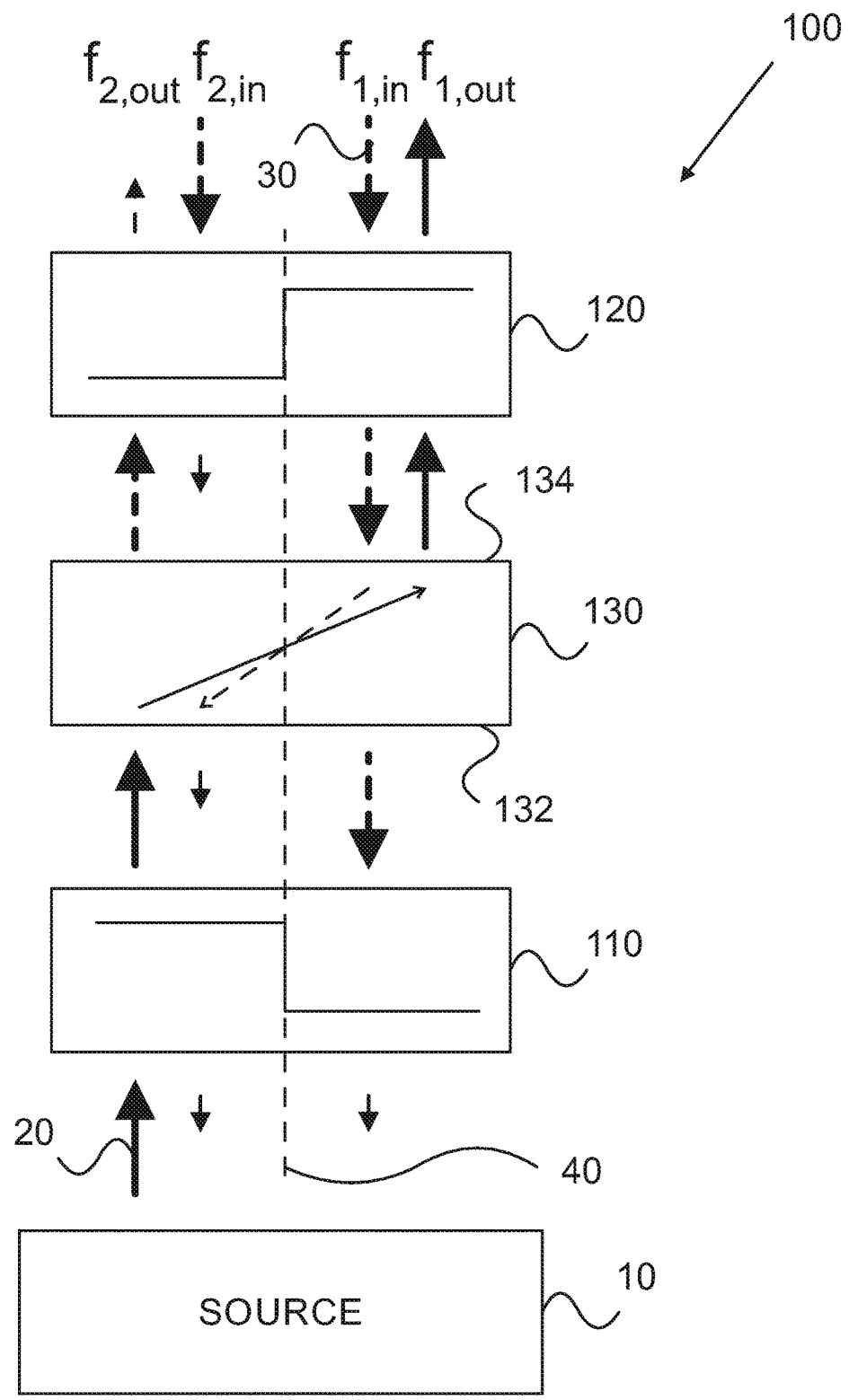
FIG. 1 illustrates an apparatus and an arrangement according to an example.

FIG. 1 shows an example of an apparatus 100 according to an example. The apparatus may be used for electromagnetic isolation, for example for a quantum computing circuit. The apparatus comprises two or more frequency filters 110, 120, which may be complementary with respect to each other. In particular, they may provide two separate signal channels: a lower frequency signal channel and a higher frequency signal channel. With two frequency filters, the channels can be non-overlapping in frequency.

The apparatus comprises one or more first frequency filters 110, which may be configured for transmitting signals having a frequency within a first lower frequency range and terminating signals having a frequency within a first higher frequency range. The first higher frequency range and the first lower frequency range may not overlap. The first lower frequency range and the first higher frequency range may be complementary so that all signals having a frequency outside the first lower frequency range are terminated and all signals having a frequency within the first lower frequency range are transmitted.

The apparatus also comprises one or more second frequency filters 120, which may be configured for terminating signals having a frequency within a second lower frequency range and transmitting signals having a frequency within a second higher frequency range. The second higher frequency range and the second lower frequency range may not overlap. The second lower frequency range and the second higher frequency range may be complementary so that all signals having a frequency outside the second higher frequency range are terminated and all signals having a frequency within the second higher frequency range are transmitted. The second higher frequency range may partially or fully coincide with the first higher frequency range. The second lower frequency range may partially or fully coincide with the first lower frequency range.

The apparatus 100 comprises a (first) frequency converter 130 (also herein "the frequency converter") having a first input/output end 132 and a second input/output end 134. The frequency converter is bidirectional so that an input signal received at the first input/output end is converted to one or more output signals provided at the second input/output end and an input signal received at the second input/output end is converted to one or more output signals provided at the first input/output end. The input signal has an input frequency. The one or more output signals may have one or more output frequencies. Importantly, the frequency converter is configured to, in response to receiving an input signal having a frequency within the first lower frequency range at the first input/output end, to provide an output signal having a frequency within the second higher frequency range at the second input/output end. Being bidirectional, it may also be configured to, in response to receiving an input signal having a frequency within the second higher frequency range at the second input/output end, provide an output signal having a frequency within the first lower frequency range at the first input/output end. The frequency converter may preserve quantum coherence for the signal while performing the conversion.

The first input/output end 132 can be configured to be coupled to the first frequency filter 110. The coupling may be indirect or direct. Similarly, the second input/output end 134 can be configured to be coupled to the second frequency filter 120. The coupling may be indirect or direct.

The couplings are thus configured for a signal 20 received as an input signal at the first frequency filter and having a frequency within the first lower frequency range to be transmitted through the apparatus 100 and produced, from the second frequency filter, as an output signal having a frequency ($f_{1,out}$) within the second higher frequency range. Here, any or all sub-signals of the input signal having a frequency outside the first lower frequency range may be terminated. Also any or all sub-signals of the output signal having a frequency ($f_{2,out}$) outside the second higher frequency range may be terminated.

Similarly, the couplings are configured for a signal 30 received as an input signal at the second frequency filter 120 having a frequency ($f_{1,in}$) within the second higher frequency range to be transmitted through the apparatus 100 and produced, from the first frequency filter 110, as an output signal having a frequency within the first lower frequency range. Here, any or all sub-signals of the input signal having a frequency ($f_{2,in}$) outside the second higher frequency range may be terminated.

The input signal for the apparatus 100, such as the readout signal, may be provided to the first frequency filter 110 or to the second frequency filter 120, depending on the orientation of the apparatus. Correspondingly, the output signal for the apparatus, such as the readout signal, may be provided from the second frequency filter 110 or from the first frequency filter 120, depending on the orientation of the apparatus. The directionality of the frequency converter 130 may indicate the directionality of the apparatus so that the input signal of the apparatus 100 may be provided as an input signal to the frequency converter and the output signal from the frequency converter may provide the output signal for the apparatus.

In FIG. 1, the horizontal axis may simply be viewed as illustrating behaviour of a signal transmitted through the apparatus 100 for different frequencies. Smaller frequencies are then on the left side, while larger frequencies are on the right side. Frequencies $f_{1,in}$ and $f_{1,out}$ may thereby be larger than $f_{2,in}$ and $f_{2,out}$. However, $f_{1,in}$ and $f_{1,out}$ may be the same or substantially the same with respect to the each other. The same holds for $f_{2,in}$ and $f_{2,out}$.

The frequency converter 130 can be configured to become non-reciprocal with respect to signal transmission between the first input/output end 132 and the second input/output end 134. Consequently, a change to signal amplitude for an input signal provided to the frequency converter may be dependent on the direction of signal transmission through the frequency converter, i.e. on whether the input signal is provided to the first input/output end or to the second/input end. The non-reciprocity corresponds to either relatively suppressing or relatively strengthening output signals of the frequency converter having a frequency within the first lower frequency range at the first input/output end of the frequency converter with respect to output signals of the frequency converter having a frequency within the second higher frequency range at the second input/output end of the frequency converter. Because of this, there is a symmetry break for signal transmission across the frequency converter, and across the apparatus 100 as a whole, depending on the signal transmission direction across the frequency converter. The non-reciprocity may be in response to an external drive signal to or for the frequency converter. The apparatus may be configured for providing the external drive signal automatically.

The apparatus 100 may be coupled, indirectly or directly, to a signal source 10, such as a quantum computing circuit, which may comprise a quantum processing unit. The symmetry break allows the apparatus to transmit a first signal, such as a readout signal, in one direction, while mitigating or preventing back-action from that signal in the other direction. The first signal may be transmitted from the signal source. Correspondingly, the first signal may be a readout signal, such as a readout signal of a quantum computing circuit. The first signal may, for example, have a frequency of 1-20 GHz or 2-10 GHz. The apparatus may be configured for a first signal having a fixed bandwidth, for example of 2-4 GHz or less. The frequency ranges for the frequency filters may be configured accordingly. The apparatus 100 may be configured for mitigating or preventing back-action to the signal source. The output of the apparatus may be coupled to one or more semiconductor amplifiers, which may be at a higher temperature in comparison to the input of the apparatus. The apparatus may be configured for mitigating or preventing back-action noise to be transmitted to the signal source, for example to a quantum processing unit.

As illustrated in FIG. 1, back-action from any or all signals having a frequency ($f_{2,in}$) outside the second higher frequency range may be mitigated or prevented altogether due to the second frequency filter 120. On the other hand, also back-action from any or all signals having a frequency ($f_{1,in}$) within the second higher frequency range may mitigated or prevented altogether due to the frequency converter 130 relatively suppressing signal transmission for such a back-action signal. Additionally, the first frequency filter 110 may suppress or terminate any sub-signal of that signal having a frequency within the first higher frequency range that may be transmitted through the frequency converter.

In FIG. 1, the solid lines illustrate the first signal transmitted through the apparatus 100. The dashed lines illustrate signals or sub-signals that are suppressed or terminated. For example, the first and the second frequency filters 110, 120 may terminate all signals, including sub-signals, not within the frequency range where they are configured to allow signals to be transmitted. The frequency converter 130 may be configured for suppressing back-action at any or all frequencies. In particular, it may be configured for suppressing back-action at a frequency range corresponding to the transmission of the first signal through the frequency converter.

The preferred direction, i.e. the forward direction, for signal transmission across the apparatus 100 may be chosen freely and the apparatus may be configured accordingly. The opposite direction, i.e. the reverse direction, may then correspond to back-action. According to a first alternative, the apparatus is configured for the first signal to be transmitted from the first input/output end 132 to the second input/output end 134 and back-action in the opposite direction to be suppressed or terminated. In this alternative, the frequency converter is configured, in response to the external signal, to produce a gain to its output signal having a frequency within the second higher frequency range at the second input/output end of the frequency converter and/or an attenuation to its output signal having a frequency within the first lower frequency range at the first input/output end of the frequency converter. In this alternative, the signal source 10 may be coupled to the apparatus, indirectly or directly, at the first frequency filter 110. The signal source then becomes coupled to the frequency converter 130 through the first frequency filter. The forward direction is from the first frequency filter to the second frequency filter. The first signal transmitted through the apparatus, for example as the readout signal, corresponds therefore the signal 20 in FIG. 1, where the signal source may be coupled to the first frequency filter. On the other hand, signal 30 then corresponds to a back-action signal.

According to a second alternative, alternatively or additionally to the first alternative, the apparatus is configured for the first signal to be transmitted from the second input/output end 134 to the first input/output end 132 and back-action in the opposite direction to be suppressed or terminated. In this alternative, the frequency converter is configured, in response to the external signal, to produce a gain to its output signal having a frequency within the first lower frequency range at the first input/output end of the frequency converter and/or an attenuation to its output signal having a frequency within the second higher frequency range at the second input/output end of the frequency converter. In this alternative, the signal source 10 may be coupled to the apparatus, indirectly or directly, at the second frequency filter 110. The signal source then becomes coupled to the frequency converter 130 through the second frequency filter. The forward direction is from the second frequency filter to the first frequency filter. The first signal transmitted through the apparatus, for example as the readout signal, corresponds therefore the signal 30 in FIG. 1, where the signal source may be coupled to the second frequency filter. On the other hand, signal 20 would then correspond to a back-action signal.

The external drive signal may determine a threshold frequency 40 across which an input signal for the frequency converter is converted. The threshold frequency may be above the first lower frequency range and below the second higher frequency range. It may also be above the second lower frequency range and below the first higher frequency range. The external drive signal may be provided by pumping such as optical pumping, e.g. of 3-way or 4-way pumping. A pumping frequency for the external drive signal may correspond to the threshold frequency, or a multiple thereof. For 4-way pumping, the pumping frequency may correspond to the threshold frequency. For 3-way pumping, the pumping frequency may correspond to twice the threshold frequency.

In a particularly important embodiment, the frequency converter comprises or consists of one or more traveling wave parametric amplifiers (TWPA). As is known, the output signal for a TWPA may comprise an idler signal having a frequency that is different from the input signal for the TWPA for which the output signal is generated. In addition to the idler signal, the output signal for the TWPA may also comprise a signal having a frequency that is the same or substantially the same as the input signal for the TWPA for which the output signal is generated. In view of the present disclosure, the apparatus 100 may be configured for utilizing the idler signal for providing the output signal of the apparatus, for example as the readout signal. The idler signal may thereby provide the signal having a frequency within the second higher frequency range, in accordance with the first alternative above, or the signal having a frequency within the first lower frequency range, in accordance with the second alternative above. This signal may become the output signal of the apparatus. The threshold frequency may correspond to a pump frequency to the TWPA, or a multiple thereof. Alternatively or additionally, the frequency converter comprises or consists of one or more tunable phase shifters and/or Josephson parametric converters. For example, the frequency converter may comprise two or more tunable phase shifters in series, and this may comprise two or more SQUID loops in series. They may have substantially perfect transmission in series. Two of the phase shifters may then be configured to produce a phase shifts in opposite directions, for example with equal magnitude. The apparatus may be configured to modulate the phase nonlinearly as a function of time, thereby making signal transmission non-reciprocal, i.e. direction-dependent.

Figure 2A:
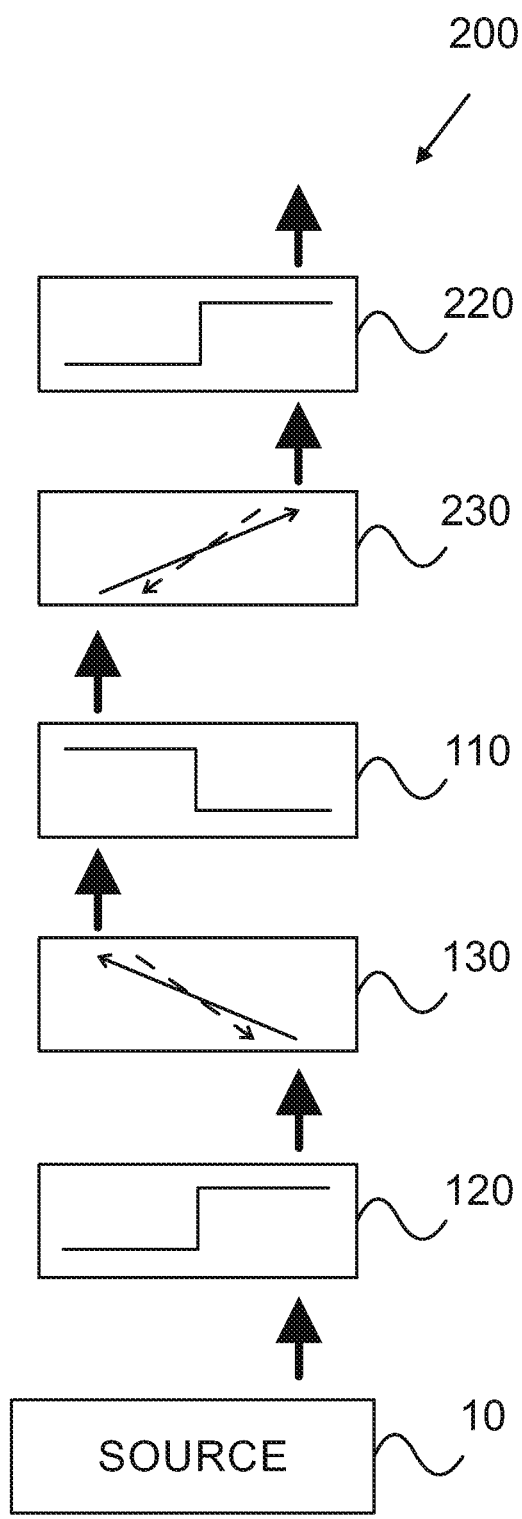
FIGS. 2a,b illustrate arrangements according to examples.
Figure 2B:
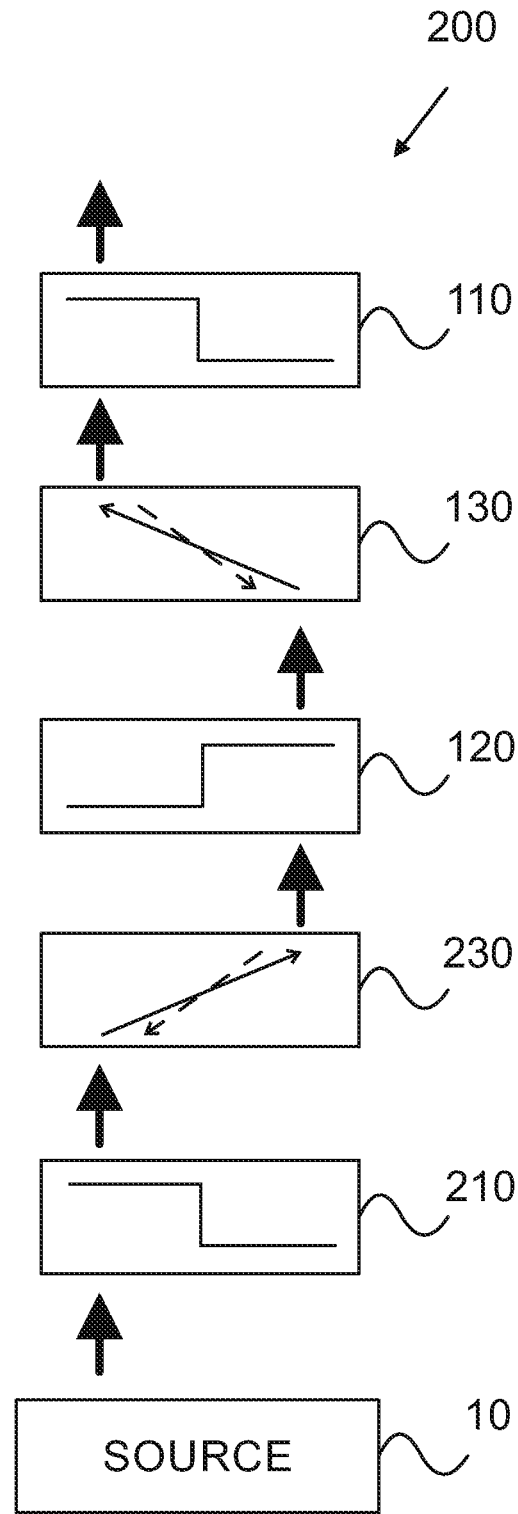

FIGS. 2a and 2b show example of an arrangement 200. The arrangement comprises the apparatus 100. However, the arrangement is configured for maintaining or at least substantially maintaining the signal frequency across the arrangement, in particular in its forward direction.

For this purpose, the arrangement 200 comprises at least one additional frequency filter, a third frequency filter 210, 220, configured for transmitting signals having a frequency within a third frequency range and terminating signals having a frequency within a frequency range outside the third frequency range. The third frequency range and the frequency range outside the third frequency range may not overlap. The third frequency range may coincide, partially or fully, with the first or the second frequency range, whichever is further away from the third frequency filter in the signal transmission direction. The frequency range outside the third frequency range may be complementary with the third frequency range so that all signals having a frequency outside the third frequency range are terminated and all signals having frequency a within the third frequency range are transmitted.

For the above purpose, the arrangement 200 also comprises at least one additional frequency converter, a second frequency converter 230, coupled between the apparatus and the third frequency filter 210, 220. The coupling may be such that, in response to an input signal having an input frequency provided to the apparatus, the arrangement is configured to produce from the third frequency filter an output signal having an output frequency corresponding substantially to the input frequency or, in response to an input signal having an input frequency provided to the third frequency filter, the arrangement is configured to produce from the apparatus an output signal having an output frequency corresponding substantially to the input frequency. The second frequency converter may be mirrored or substantially mirrored with respect to the (first) frequency converter for frequency conversion, at least in terms of the converted frequency values. Apart from the fact that the (first) and the second frequency converters convert perform frequency conversion in opposite directions with respect to frequency, they may be similar or even identical, or different. Like the (first) frequency converter 130, the second frequency converter may also be configured to become non-reciprocal with respect to signal transmission between its first input/output end and the second input/output end. In particular, the second frequency converter may be configured for favoring signal transmission in the same direction as the (first) frequency converter. The non-reciprocity may be in response to an external drive signal to or for the second frequency converter. The arrangement may be configured for providing the external drive signal automatically. It may be provided simultaneously or separately with respect to the external drive signal to or for the (first) frequency converter. The (first) frequency converter and the second frequency converter may also share the external drive signal. The second frequency converter 230 may comprise or consist of one or more TWPAs. Alternatively or additionally, it may comprise or consist of one or more tunable phase shifters and/or Josephson parametric converters.

The third frequency filter 210, 220 and the second frequency converter 230 may be coupled before or after the apparatus 100. In both cases, the second frequency converter may be coupled between the third frequency filter and the apparatus. As for the apparatus 100, the arrangement 200 may be configured to have a forward direction for signal transmission from the first frequency filter to the second frequency filter or from the second frequency filter to the first frequency filter. In both cases, the third frequency filter may be before or after the first frequency filter and the second frequency filter, thereby providing four possible configurations for the arrangement. The arrangement, and the corresponding method, may be provided with any of the following four orderings: first filtering-(first) frequency conversion-second filtering-second frequency conversion-third filtering; second filtering-(first) frequency conversion-first filtering d frequency conversion-third filtering; third filtering-second frequency conversion-second filtering-(first) frequency conversion-first filtering; and third filtering-second frequency conversion-first filtering-(first) frequency conversion second filtering. Of these, FIG. 2a illustrates the second example, whereas FIG. 2b illustrates the third example. In both cases, the (first) frequency converter is configured for favoring signal transmission in the forward direction from the second frequency filter to the first frequency filter. The first example may be obtained from the arrangement of FIG. 2b with the signal source 10 coupled to the opposite end of the arrangement, i.e. to the first frequency filter 110, and the frequency conversion at the (first) frequency converter being configured for favoring signal transmission in the forward direction from the first frequency filter to the second frequency filter. The fourth example may be obtained from the arrangement of FIG. 2a with the signal source 10 coupled to the opposite end of the arrangement, i.e. to the third frequency filter 220, and the frequency conversion at the (first) frequency converter being configured for favoring signal transmission in the forward direction from the first frequency filter to the second frequency filter.

For the apparatus 100, in general, the first and/or the second frequency filter 110, 120 may be passive filters. In particular, the first and/or the second frequency filter 110, 120 may be provided by diplexers. However, instead of separating two frequency bands for further transmission, one of the bands may be terminated. The frequency filter(s) may comprise one or more resistors for signal termination. The first and/or the second filter may be configured to be seen in a circuit as resistive filters, for example for all frequencies or for frequencies within any or all of the first lower frequency range, the first higher frequency range, the second lower frequency range, the second higher frequency range, the third frequency range and the frequency range outside the third frequency range. For the electromagnetic isolation, they may function as resistive filters, for example having resistance of 50 Ohms+/−0-10 Ohms or 50 Ohms+/−0-2 Ohms, or substantially 50 Ohms. The reflection of the frequency filter(s), for example as represented by a reflection parameter (s11), may be smaller than the gain of the frequency converter in the forward direction, e.g. away from the signal source 10. All of the above applies also to the third frequency filter 210, 220.

The apparatus 100 and the arrangement may be configured for operation at cryogenic temperatures. This applies to any or all of the components disclosed herein, in particular to the first frequency filter, the second frequency filter and the (first) frequency converter, and optionally the third frequency filter and/or the second frequency converter.

Figure 3:
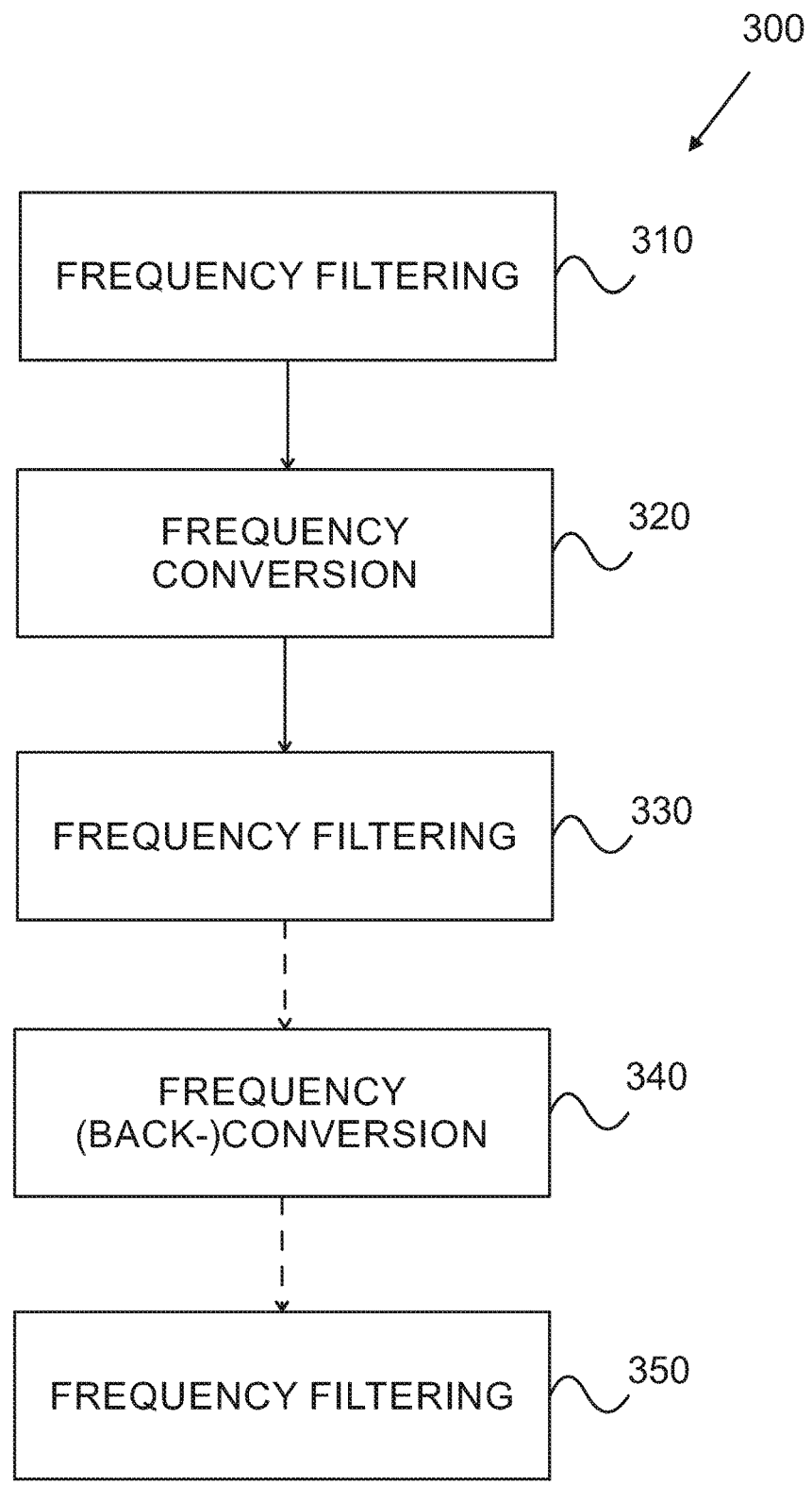
FIG. 3 illustrates methods according to examples.

FIG. 3 shows examples of methods. A method 300 may comprise any acts discussed in relation to the apparatus 100 and/or the arrangement 200. The method may be used for electromagnetic isolation, for example for isolating a quantum computing circuit, which may be at a cryogenic operating temperature from electronics, such as one or more amplifiers, at a higher temperature.

The method 300 comprises facilitating a first frequency filtering at a first frequency filter and facilitating a second frequency filtering at a second frequency filter. In the first filtering, signals having a frequency within a first lower frequency range are transmitted and signals having a frequency within a first higher frequency range are terminated. In the second filtering, signals having a frequency within a second lower frequency range are terminated and signals having a frequency within a second higher frequency range are transmitted. The first and the second frequency filtering may be mirrored in frequency with respect to each other. The two filterings may be performed in a series configuration so that the first frequency filter is in series with the second frequency filter. Optionally, the method may comprises facilitating a third frequency filtering at a third frequency filter. In the third filtering, signals having a frequency within a third frequency range may be transmitted and signals having a frequency within a frequency range outside the third frequency range may be terminated. As indicated above, the third frequency range may coincide, partially or fully, with either the first frequency range or the second frequency range. In any case, what is stated regarding any of the frequency ranges applies throughout the disclosure for the apparatus, the arrangement and the method.

The method 300 also comprises facilitating (first) frequency conversion between a first input/output end coupled to the first frequency filter and a second input/output end coupled to the second frequency filter. The frequency conversion may be performed by the (first) frequency converter 130 so that the first input/output end is the first input/output end 132 of the frequency converter and the second input/output end is the second input/output end of the frequency converter. The frequency conversion may be performed in a series configuration with respect to the two filterings so that the frequency conversion is performed between the first frequency filtering and the second frequency filtering, the relative order of which in the series configuration may be determined to mitigate back-action for electromagnetic isolation, for example as shown in the context of the apparatus 100 or the arrangement 200. The frequency conversion may be performed non-reciprocally with respect to signal transmission between the first input/output end and the second input/output end, for example in response to an external drive signal for the frequency conversion, for either relatively suppressing or relatively strengthening output signals of the frequency conversion having a frequency within the first lower frequency range at the first input/output end with respect to output signals of the frequency conversion having a frequency within the second higher frequency range at the second input/output end. The (first) frequency conversion can be made non-reciprocal so that signal transmission in one direction can be favored. Together with the first and the second filtering, this allows the method to be used for electromagnetic isolation so that signal transmission from a signal source is favored with respect to signal transmission towards the signal source.

Optionally, and when the method comprises the third frequency filtering, the method may also comprise facilitating a second frequency conversion. This may be performed by the second frequency converter 230 and it may involve any of the features described in conjunction to the second frequency converter. In particular, the second frequency conversion may mirror or substantially mirror the frequency conversion with respect to the (first) frequency conversion, at least in terms of the converted frequency values. The second frequency conversion may be performed in series configuration with respect to the filterings so that it is performed between the third frequency filtering and whichever of the first and the second frequency filtering is performed between 330 the two other frequency filterings. The third frequency filtering is thereby always performed as the first 310 or the last 350 of the three frequency filterings in the series configuration. In the first case, the second frequency conversion is performed, in the series configuration, before the first and the second frequency filtering and the (first) frequency conversion, whereas in the latter case the second frequency conversion is performed, in the series configuration, after the first and the second frequency filtering and the (first) frequency conversion.

Correspondingly, the method can be performed so that, in response to the first frequency filtering, the (first) frequency conversion and the second frequency filtering being performed to an input signal having an input frequency, an output signal having an output frequency corresponding substantially to the input frequency is produced from the third frequency filter. This happens in the second case discussed above. In the series configuration, the input signal is first 310 subjected to the first or the second frequency filtering, then 320 to the (first) frequency conversion, then 330 to the second or the first frequency filtering, whichever has not yet been performed, then 340 to second frequency conversion and then to the third frequency filtering. In the forward direction for electromagnetic isolation, this corresponds to transmitting the (first) signal, for example as a readout signal, from a signal source, for example to a higher temperature processing phase. The second frequency conversion may thereby correspond to a back-conversion of frequency, while the centermost frequency filtering 330 of the three frequency filterings 310, 330, 350 suppresses any or all non-converted back-action signals or sub-signals from being transmitted across the two frequency conversions 320, 340.

Alternatively, the method can be performed so that, in response to providing an input signal having an input frequency to the third frequency filter an output signal having an output frequency corresponding substantially to the input frequency is produced from the first or the second frequency filter. This happens in the first case discussed above. In the series configuration, the input signal is first 310 subjected to the third frequency filtering, then 320 to the second frequency conversion, then 330 to the first or the second frequency filtering, then 340 to (first) frequency conversion and then to the second or the first frequency filtering, whichever has not yet been performed. In the forward direction for electromagnetic isolation, this also corresponds to transmitting the (first) signal, for example as a readout signal, from a signal source, for example to a higher temperature processing phase. Here, the first frequency conversion may correspond to a back-conversion of frequency, while the centermost frequency filtering 330 of the three frequency filterings 310, 330, 350 suppresses any or all non-converted back-action signals or sub-signals from being transmitted across the two frequency conversions 320, 340.

The method 300 may be performed at a cryogenic temperature. The method may be performed for mitigating or preventing back-action noise to be transmitted to a signal source, for example to a quantum processing unit.

Regarding the apparatus 100, the arrangement 200 and the method 300, TWPA has been found to provide particularly favorable characteristics for non-reciprocal frequency conversion. For a TWPA, forward gain and reverse gain may differ. Also, the amplitude of the reverse and forward generation of idler signals across the TWPA may differ. The input and output filter transmission spectrum for the TWPA may be separated into two frequency ranges such that reverse signals can be eliminated by the input and output filters, here facilitating the first and the second filtering. The TWPA may generate a forward idler signal without interference from the filters. The original signal having the input frequency may be eliminated by the first and/or the second filtering. However, the same information may be transmitted by the idler signal, which may be used as an output signal for read out of any or all information pertaining to the input signal. On the other hand, any reverse idler signal generated by the TWPA may be markedly attenuated.

Figure 4A:
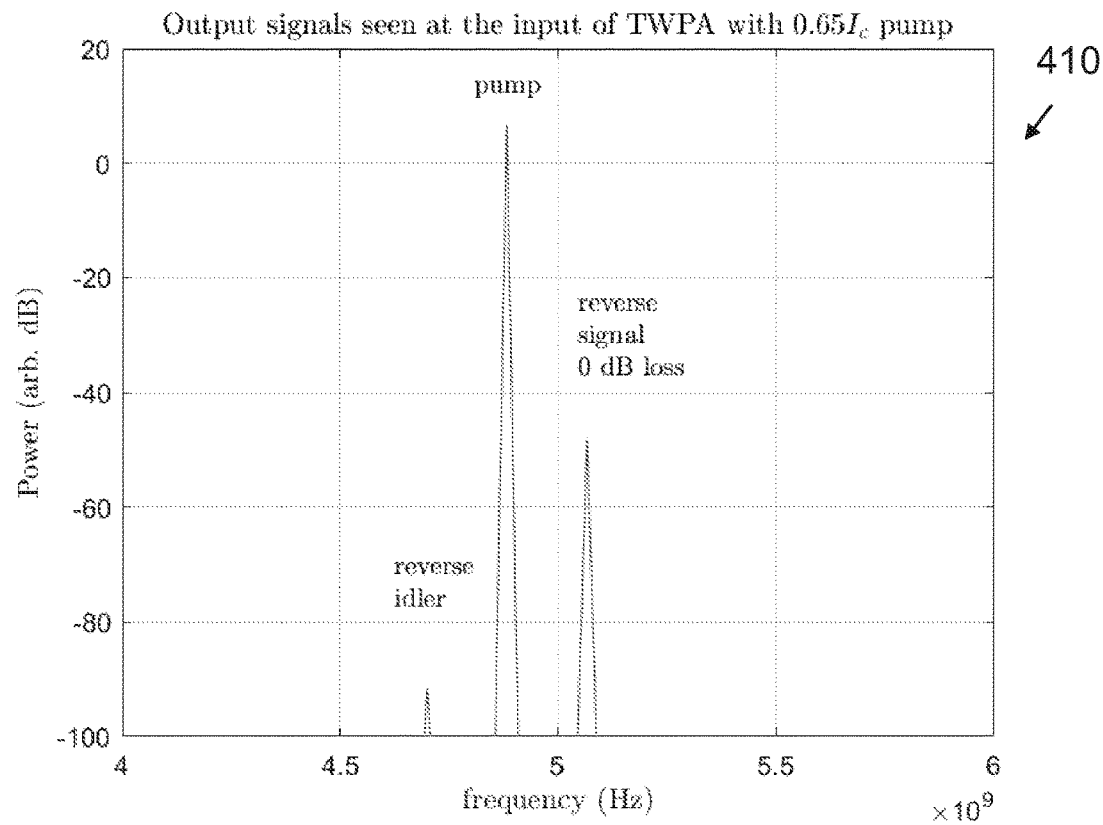
FIGS. 4a,b illustrate simulations according to an example.
Figure 4A:
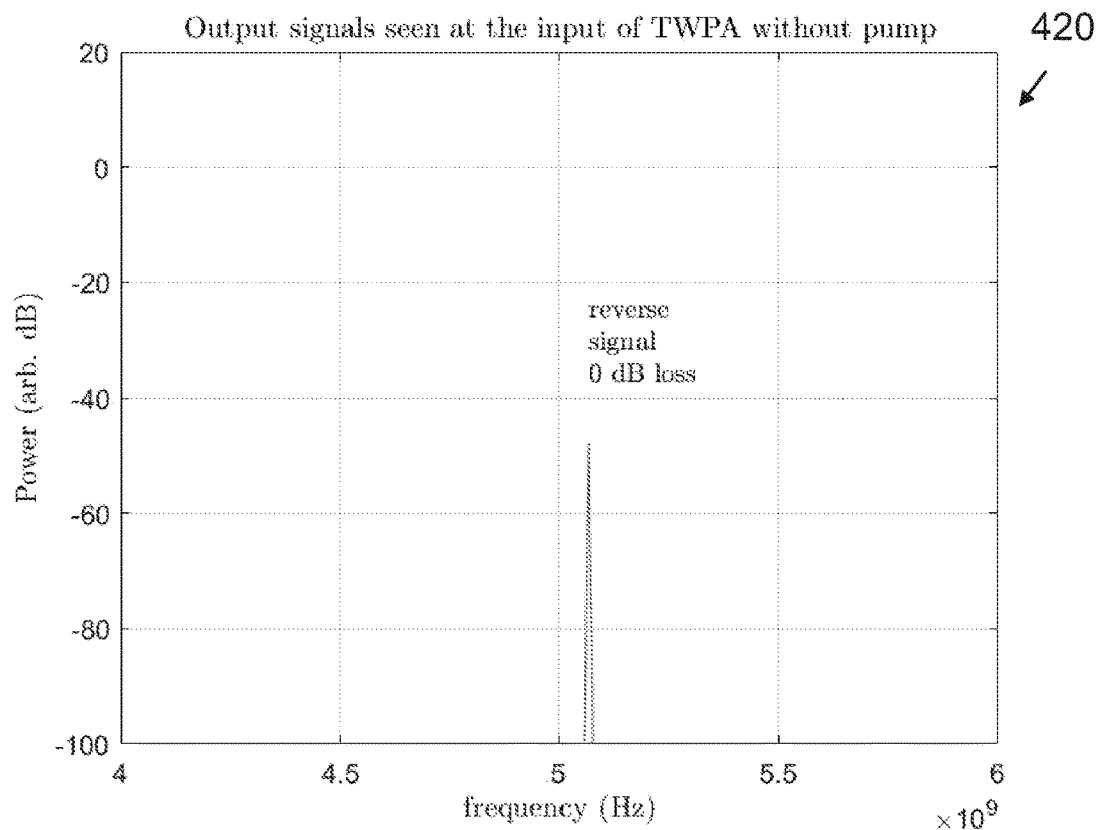
Figure 4B:
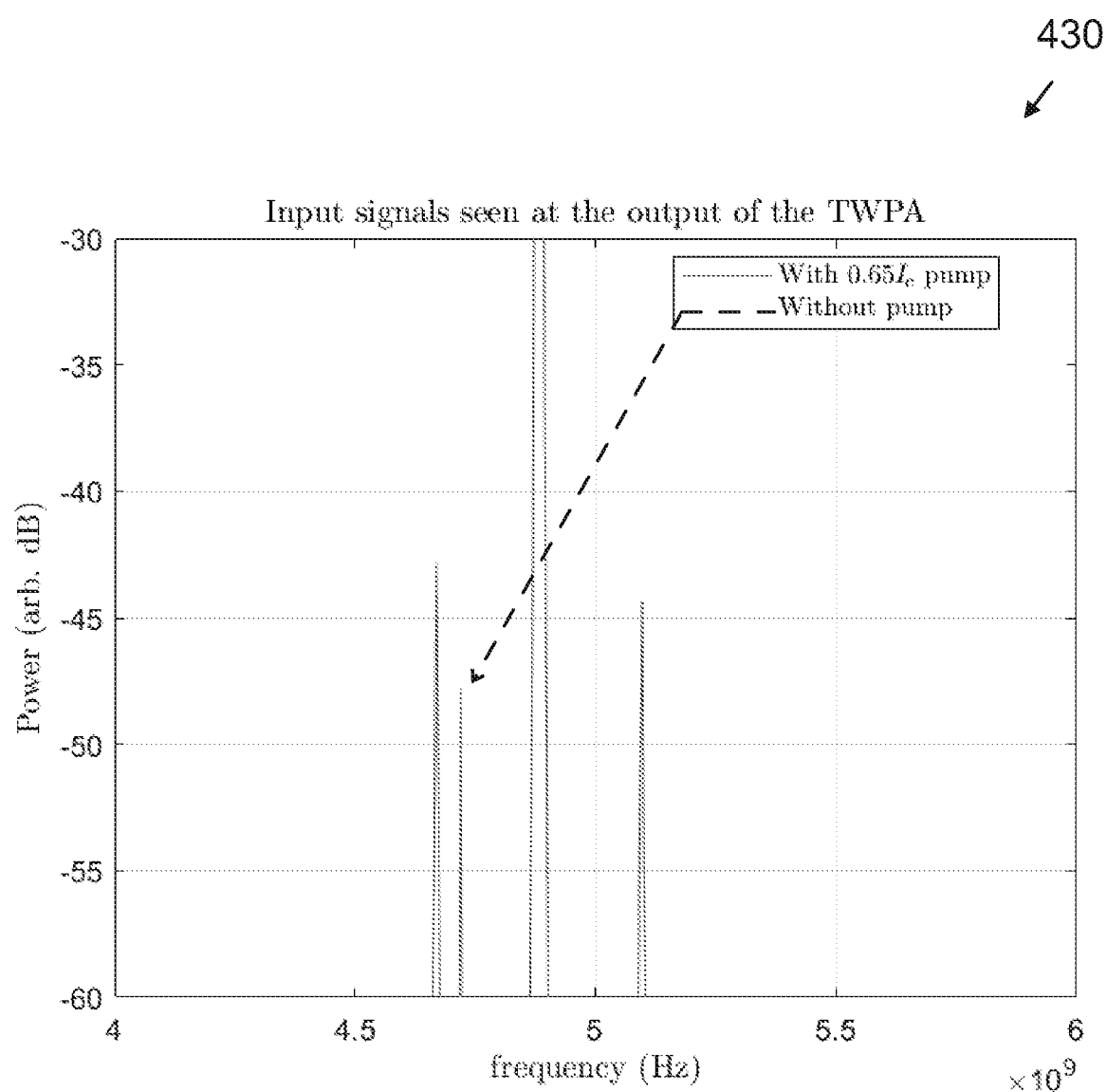

FIGS. 4a, b, c show an example of simulations. In these examples, a simplified version of a TWPA is numerically simulated to illustrate how a reverse idler signal for a TWPA under forward pumping may be attenuated. Without pumping, the simulated circuit has near unity transmission in both forward and reverse directions as seen from FIGS. 4a: 420 and 4c. As illustrated in FIG. 4a: 410, under pumping the TWPA can be configured for the reverse transmission to remain unity, while forward direction exhibits gain. In FIG. 4b: 430, the signal without pumping has been slightly offset in frequency so that it does not overlap with the adjacent peak corresponding to the signal with pumping and the change in amplitude can be more easily verified. In this figure, the highest peak corresponds to pumping and is therefore not part of the input/output signal characteristics.

The different functions discussed herein may be performed in a different order and/or concurrently with each other, unless indicated otherwise.

Any range or device value given herein may be extended or altered without losing the effect sought, unless indicated otherwise. Also any example may be combined with another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

Numerical descriptors such as 'first', 'second', and the like are used in this text simply as a way of differentiating between parts that otherwise have similar names. The numerical descriptors are not to be construed as indicating any particular order, such as an order of preference, manufacture, or occurrence in any particular structure.

Although the invention has been the described in conjunction with a certain type of apparatus and/or method, it should be understood that the invention is not limited to any certain type of apparatus and/or method. While the present inventions have been described in connection with a number of examples, embodiments and implementations, the present inventions are not so limited, but rather cover various modifications, and equivalent arrangements, which fall within the purview of the claims. Although various examples have been described above with a certain degree of particularity, or with reference to one or more individual embodiments, those skilled in the art could make numerous alterations to the disclosed examples without departing from the scope of this specification.

The invention claimed is:

1. An apparatus for electromagnetic isolation for a quantum computing circuit, the apparatus comprising:
   a first frequency filter configured for transmitting signals having a frequency within a first lower frequency range and terminating signals having a frequency within a first higher frequency range;
   a second frequency filter configured for terminating signals having a frequency within a second lower frequency range and transmitting signals having a frequency within a second higher frequency range; and
   a frequency converter having a first input/output end coupled to the first frequency filter and a second input/output end coupled to the second frequency filter, the frequency converter being configured to become non-reciprocal with respect to signal transmission between the first input/output end and the second input/output end in response to an external drive signal to the frequency converter for either relatively suppressing or relatively strengthening output signals of the frequency converter having a frequency within the first lower frequency range at the first input/output end of the frequency converter with respect to output signals of the frequency converter having a frequency within the second higher frequency range at the second input/output end of the frequency converter.

2. The apparatus according to claim 1, wherein, in response to the external drive signal, the frequency converter is configured to produce a gain to its output signal having a frequency within the second higher frequency range at the second input/output end of the frequency converter and/or an attenuation to its output signal having a frequency within the first lower frequency range at the first input/output end of the frequency converter.

3. The apparatus according to claim 1, wherein, in response to the external drive signal, the frequency converter is configured to produce a gain to its output signal having a frequency within the first lower frequency range at the first input/output end of the frequency converter and/or an attenuation to its output signal having a frequency within the second higher frequency range at the second input/output end of the frequency converter.

4. The apparatus according to claim 1, wherein the frequency converter is a traveling wave parametric amplifier.

5. The apparatus according to claim 1, wherein the frequency converter is a tunable phase shifter and/or a Josephson parametric converter.

6. The apparatus according to claim 1, wherein the first frequency filter and/or the second frequency filter is a passive filter.

7. The apparatus according to claim 1, wherein the first lower frequency range corresponds to the second lower frequency range and/or the first higher frequency range corresponds to the second higher frequency range.

8. An arrangement comprising:
   an apparatus according to claim 1;
   a third frequency filter configured for transmitting signals having a frequency within a third frequency range and terminating signals having a frequency within a frequency range outside the third frequency range; and
   a second frequency converter coupled between the apparatus and the third frequency filter so that:
      in response to an input signal having an input frequency provided to the apparatus, the arrangement is configured to produce from the third frequency filter an output signal having an output frequency corresponding substantially to the input frequency; or
      in response to an input signal having an input frequency provided to the third frequency filter, the arrangement is configured to produce from the apparatus an output signal having an output frequency corresponding substantially to the input frequency.

9. An arrangement comprising a quantum processing unit coupled to the arrangement of claim 8 for preventing back-action noise into the quantum processing unit.

10. An arrangement comprising a quantum processing unit coupled to one or more apparatuses according to claim 1 for preventing back-action noise into the quantum processing unit.

11. A method for electromagnetic isolation for a quantum computing circuit, the method comprising:
   facilitating frequency filtering at a first frequency filter, where signals having a frequency within a first lower frequency range are transmitted and signals having a frequency within a first higher frequency range are terminated;
   facilitating frequency filtering at a second frequency filter, where signals having a frequency within a second lower frequency range are terminated and signals having a frequency within a second higher frequency range are transmitted; and facilitating frequency conversion between a first input/output end coupled to the first frequency filter and a second input/output end coupled to the second frequency filter, the frequency conversion being non-reciprocal with respect to signal transmission between the first input/output end and the second input/output end in response to an external drive signal for the frequency conversion for either relatively suppressing or relatively strengthening output signals of the frequency conversion having a frequency within the first lower frequency range at the first input/output end with respect to output signals of the frequency conversion having a frequency within the second higher frequency range at the second input/output end.

12. The method according to claim 11, wherein, in response to the external drive signal, the frequency conversion produces a gain to its output signal having a frequency within the second higher frequency range at the second input/output end and/or an attenuation to its output signal having a frequency within the first lower frequency range at the first input/output end.

13. The method according to claim 11, wherein, in response to the external drive signal, the frequency conversion produces a gain to its output signal having a frequency within the first lower frequency range at the first input/output end and/or an attenuation to its output signal having a frequency within the second higher frequency range at the second input/output end.

14. The method according to claim 11, wherein the frequency conversion is facilitated by a traveling wave parametric amplifier.

15. The method according to claim 11, wherein the frequency conversion is facilitated by a tunable phase shifter and/or a Josephson parametric converter.

16. The method according to claim 11, wherein the frequency filtering at the first frequency filter and/or the second frequency filter is performed passively.

17. The method according to claim 11, wherein the first lower frequency range corresponds to the second lower frequency range and/or the first higher frequency range corresponds to the second higher frequency range.

18. A method comprising:
performing a first method according to claim 11;
facilitating frequency filtering at a third frequency filter, where signals having a frequency within a third frequency range are transmitted and signals having a frequency within a frequency range outside the third frequency range are terminated;
facilitating a second frequency conversion between frequency filtering at the third frequency filter and frequency filtering at the first frequency filter or the second frequency filter so that:
in response to the first method being performed to an input signal having an input frequency, an output signal having an output frequency corresponding substantially to the input frequency is produced from the third frequency filter; or
in response to providing an input signal having an input frequency to the third frequency filter an output signal having an output frequency corresponding substantially to the input frequency is produced from the first frequency filter or the second frequency filter.

19. A method according to claim 11, performed for preventing back-action noise into a quantum processing unit.

* * * * *